E. F. & T. F. BIRKENKAMP.
PNEUMATIC CONVEYER.
APPLICATION FILED MAY 31, 1911.
1,034,961.
Patented Aug. 6, 1912.
2 SHEETS—SHEET 1.
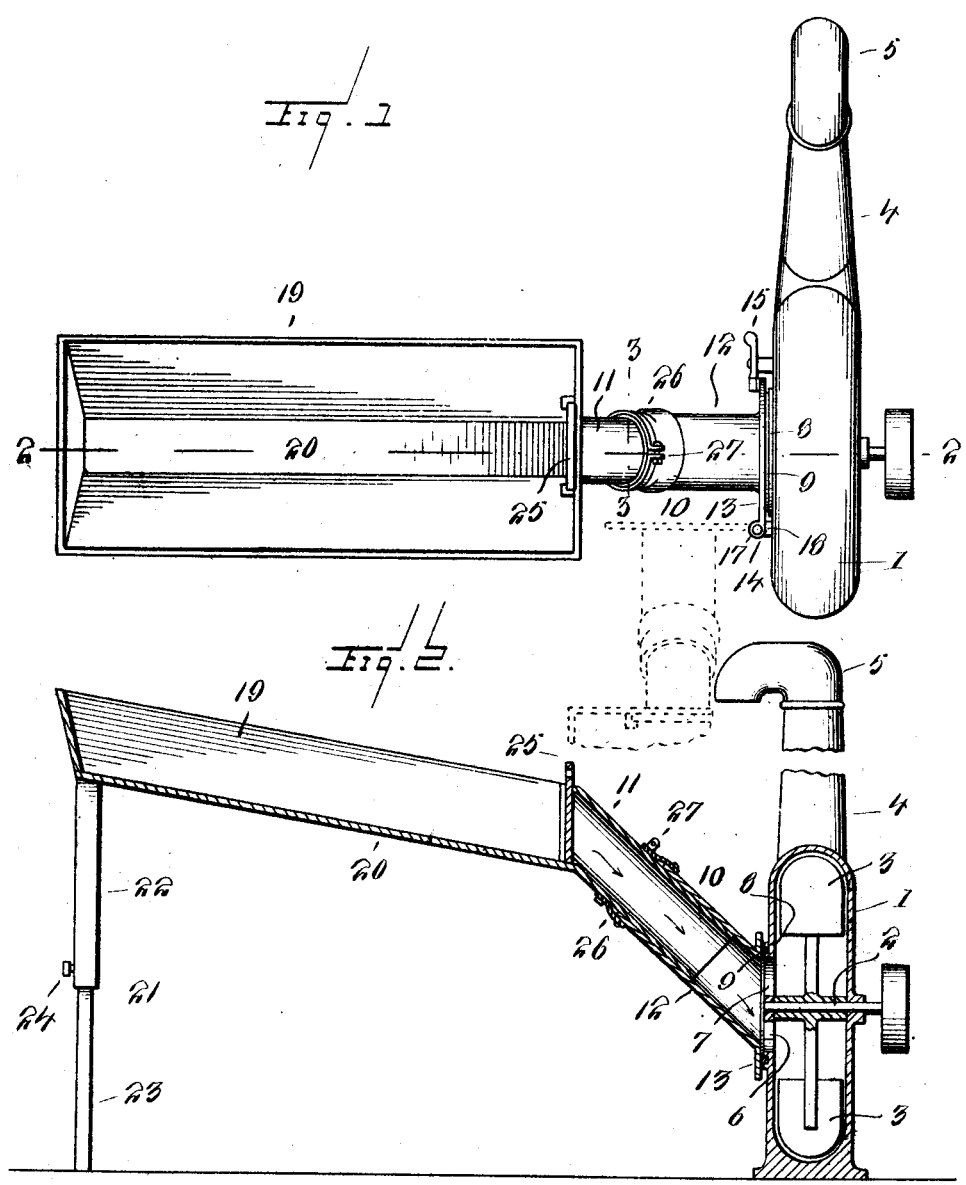
Witnesses
E. R. Ruppert
James A. Koehl
Inventors
Edward F. Birkenkamp
Theodor F. Birkenkamp
By Victor J. Evans
Attorney E. F. & T. P. BIRKENKAMP.
PNEUMATIC CONVEYER.
APPLICATION FILED MAY 31, 1911.
1,034,961.
Patented Aug. 6, 1912.
2 SHEETS—SHEET 2.
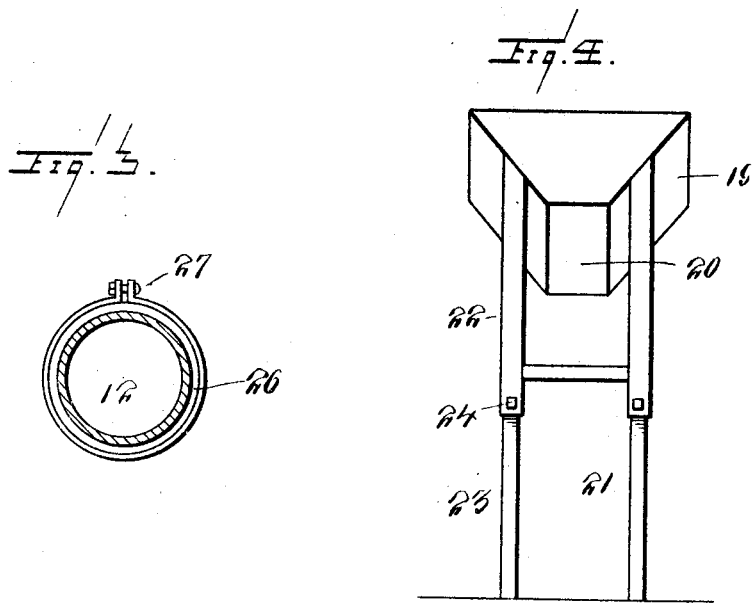
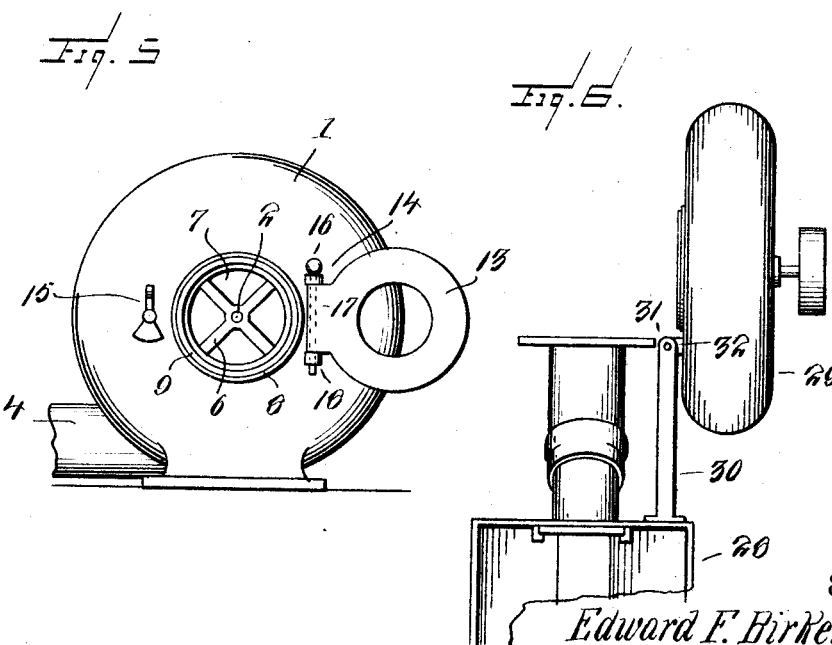
Witnesses
E. P. Ruppert
James a Roche
Inventors
Edward F. Birkenkamp
Theodor Birkenkamp
By Victor J. Evans
Attorney

UNITED STATES PATENT OFFICE.

EDWARD F. BIRKENKAMP AND THEODOR F. BIRKENKAMP, OF FARMERSVILLE, ILLINOIS.

PNEUMATIC CONVEYER.

1,034,961. Specification of Letters Patent. Patented Aug. 6, 1912.

Application filed May 31, 1911. Serial No. 630,289.

*To all whom it may concern:*

Be it known that we, EDWARD F. BIRKENKAMP and THEODOR F. BIRKENKAMP, citizens of the United States, residing at Farmersville, in the county of Montgomery and State of Illinois, have invented new and useful Improvements in Pneumatic Conveyers, of which the following is a specification.

This invention relates to pneumatic conveyers, and has for an object to provide a conveyer which will include a blast-fan and a hopper which are adjustably connected with each other so that the grain when delivered to the hopper will be automatically conveyed to the blast-fan, from which latter the grain can be effectively conveyed to the bins of the granary.

Another object of the invention is to provide means for adjusting the blast-fans and the hopper relatively so as to permit of the latter being operatively associated with the wagon or the like from which the grain is to be unloaded.

A still further object of the invention is to provide means for forming a perfect airtight joint between the opening at one side of the blast-fan casing and the conduit of the hopper so that a suction will be created in the conduit when the fan is operated to thereby cause the grain to be drawn downwardly in the conduit for its effective discharge into the fan casing.

In the drawings, forming a portion of this specification and in which like numerals of reference indicate similar parts in the several views: Figure 1 is a top plan view of the conveyer showing the hopper in its receiving position in full lines and in its folded position in dotted lines. Fig. 2 is a section on line 2—2 of Fig. 1. Fig. 3 is a section on line 3—3 of Fig. 1. Fig. 4 is an end view of the hopper. Fig. 5 is a side view of the fan casing showing a portion of the conduit of the hopper thereon, the latter being in an open position. Fig. 6 is a side view showing a slightly modified form of hopper.

Our improved conveyer comprises a fan casing 1 in which is revolubly mounted a horizontal fan shaft 2 which may be driven by any well known suitable and approved means, the said fan shaft having mounted thereon a plurality of radial blades 3 which are adapted to create the required up-draft in the conveying tube or conduit 4. The conduit 4 is preferably constructed of telescopic sections, the uppermost section being provided with a flexible adjustable hood 5 to facilitate directing the grain to the desired bin when the apparatus is in use.

One end of the fan shaft is mounted in a spider 6 in the draft opening 7 at one side of the fan casing. At this side of the fan casing, and exteriorly thereof, is a circular retainer 8 in which is mounted a gasket 9. The hopper conduit 10 comprises an upper section 11 and a lower section 12, the latter having an attaching plate 13 thereon which is hinged, at 14, to one side of the fan casing, being adapted for frictional contact with the gasket 9 so as to effect a perfect airtight connection at this point, a suitable clamp 15 being employed for the purpose of securely holding the plate 13 confined against the gasket. The hinge-pin 16 which connects the hinge-knuckles 17 of the plate 13 with the hinge-knuckle 18 of the fan casing is removable so as to permit the hopper to be readily disconnected from the fan casing when desired.

The hopper 19 is provided with a bottom 20 which inclines downwardly in the direction of the conduit 10 so that the grain will tend to flow by gravity to the conduit as will be understood. The section 11 of the conduit is preferably formed as an integral part of the hopper, the upper end thereof being arranged in open communication with the hopper, as shown. At the outer end, the hopper is provided with supporting legs 21 which include the telescopic sections 22 and 23 and the set screws 24 for holding the sections in their adjusted positions. From this construction the hopper can be adjusted vertically with respect to the ground and thereby disposed in effective receiving position with the wagon or the like from which the grain is to be unloaded.

At the discharge end the hopper is provided with a suitable regulating gate 25 which may be operated so as to govern the flow of the grain to the fan casing. When the apparatus is not in use the hopper can be readily swung to one side, as shown in the dotted line position shown in Fig. 1, where it will remain out of the path of the roadway. From the construction of the conveyer it is evident that when the fan is in operation the air will be drawn into the casing by way of the conduit 10, as illustrated by the arrows in Fig. 2 of the drawings. This causes a positive feed of the grain from the hopper to the casing. The upper end of the section 12 of the grain conduit 10 is provided with an elastic sleeve 26 which is adapted to, be effectively adjusted against the exterior of the section 11 of the conduit through the medium of the clamp 27. This seals the joint between the sections 11 and 12 and causes the air to be drawn into the conduit through the hopper.

In the modified form of the invention shown in Fig. 6 of the drawings, the hopper 28 is mounted upon the fan casing 29 by means of a swinging bracket 30, the latter having pintles 31 which are operatively mounted in horizontally disposed eye members 32 which extend from the fan casing, being disposed thereon so as to permit the hopper to be readily moved into its operative or inoperative position as the occasion may warrant.

We claim:

In a conveyer, a blower casing having an intake opening therein at one side and a discharge tube extending at right angles to the axis of said opening, a vertically adjustable hopper, a feed tube extending from said hopper and provided at its discharge end with an annular plate, having a hinged knuckle, a gate adjustable across the hopper at the point of connection of the feed tube therewith, another hinged knuckle located adjacent to the intake opening of the blower casing, a pin connecting the former and latter mentioned hinged knuckles, whereby said hopper may be swung from operative position at right angles to the blower casing to a position parallel to the blower casing, and a fan mounted in said blower casing.

In testimony whereof we affix our signatures in presence of two witnesses.

EDWARD F. BIRKENKAMP.
THEODOR F. BIRKENKAMP.

Witnesses:
WM. H. LEAHAN,
ALBERT GUTHALS.